United States Patent
Lee et al.

(10) Patent No.: US 9,371,771 B2
(45) Date of Patent: Jun. 21, 2016

(54) PRECOMBUSTION CHAMBER FOR GAS ENGINE

(75) Inventors: Dae-Jin Lee, Ulsan (KR);
Kwang-Cheol Heo, Ulsan (KR);
Chae-Soon Lim, Ulsan (KR); Jong-Suk Kim, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 83 days.

(21) Appl. No.: 14/131,946

(22) PCT Filed: Jul. 19, 2012

(86) PCT No.: PCT/KR2012/005753
§ 371 (c)(1),
(2), (4) Date: Jan. 10, 2014

(87) PCT Pub. No.: WO2013/012258
PCT Pub. Date: Jan. 24, 2013

(65) Prior Publication Data
US 2014/0165958 A1    Jun. 19, 2014

(30) Foreign Application Priority Data
Jul. 19, 2011    (KR) .................. 10-2011-0071459

(51) Int. Cl.
*F02B 19/00* (2006.01)
*F02B 19/12* (2006.01)
*F02M 21/02* (2006.01)
(Continued)

(52) U.S. Cl.
CPC ........ *F02B2075/125* (2013.01); *F02B 2275/22* (2013.01); *Y02T 10/125* (2013.01); *Y02T 10/32* (2013.01) *F02B 19/12* (2013.01); *F02M 21/0275* (2013.01); *F02M 21/0281* (2013.01); *F02B 1/04* (2013.01); *F02B 23/08* (2013.01);
(Continued)

(58) Field of Classification Search
CPC ............ F02B 1/04; F02B 19/12; F02B 23/08; F02B 2275/22; F02B 2075/125
USPC .......................................................... 123/260
See application file for complete search history.

(56) References Cited

U.S. PATENT DOCUMENTS 2,156,327 A * 5/1939 Zinner ......................... 123/275
4,672,933 A * 6/1987 Taniguchi et al. ............ 123/270
(Continued)

FOREIGN PATENT DOCUMENTS

JP    10-089192 A    4/1998
JP    2001-132603 A    5/2001
(Continued)

*Primary Examiner* — Lindsay Low
*Assistant Examiner* — Charles Brauch
(74) *Attorney, Agent, or Firm* — Rabin & Berdo, P.C.

(57) ABSTRACT

Disclosed herein is a precombustion chamber structure for a gas engine. The precombustion chamber structure is configured to facilitate disassembly of a precombustion chamber tip, thus making maintenance, repair or inspection of the precombustion chamber easy. For this, the precombustion chamber structure includes: a body (110) having a main body (111), a water jacket (112) and a precombustion chamber tip (113); and a spark plug (120) for igniting fuel gas injected into the precombustion chamber (114) formed in the body (110). The precombustion chamber structure ignites fuel gas and supplies the ignited fuel gas into a main combustion chamber. A tool insert groove (1131) is formed in the junction between the precombustion chamber tip and the water jacket. The tool insert groove (1131) allows a tool for disassembly to be inserted into a space between the precombustion chamber tip and the water jacket.

5 Claims, 3 Drawing Sheets

(51) Int. Cl.
*F02B 1/04* (2006.01)
*F02B 75/12* (2006.01)
*F02B 23/08* (2006.01)

(56) References Cited

U.S. PATENT DOCUMENTS 5,555,867 A * 9/1996 Freen .............................. 123/260

6,843,220 B2 * 1/2005 Lausch .................... F02B 1/12
123/255

FOREIGN PATENT DOCUMENTS

| | | |
|---|---|---|
| JP | 2002-030936 A | 1/2002 |
| JP | 2003-254195 A | 9/2003 |
| JP | 2011-503416 A | 1/2011 |
| KR | 10-2011-0053049 A | 5/2011 |

* cited by examiner

PRECOMBUSTION CHAMBER FOR GAS ENGINE

TECHNICAL FIELD

The present invention relates, in general, to precombustion chamber structures for gas engines and, more particularly, to a precombustion chamber structure for a gas engine which is configured to facilitate assembly and disassembly of a precombustion chamber tip that forms a precombustion chamber, and which can provide a reliable sealing structure for prevention of leakage of gas and enhance combustion performance in the precombustion chamber, thus improving the performance of the engine.

BACKGROUND ART

Generally, gas engines are internal combustion engines that use gas as fuel, which are advantageous in that fuel expense can be reduced compared to that of gasoline fuel, thermal efficiency is comparatively high thanks to combustion efficiency that is close to that of complete combustion, and the pollution rate from exhaust gas is low.

Meanwhile, to enhance the efficiency and output of such a gas engine, a precombustion chamber structure which ignites fuel gas before supplying it into a main combustion chamber is provided in a cylinder head of the gas engine FIG. 1 is a sectional view of a conventional precombustion chamber structure for a gas engine.

The conventional precombustion chamber structure includes a body 10 which has formed therein a precombustion chamber 30 for precombustion of fuel gas, and a spark plug 20 which is installed in the body 10 to ignite fuel gas injected into the precombustion chamber 30.

The body 10 includes a main body 11, a water jacket 12 and a precombustion chamber tip 13. A gas supply passage 14 through which fuel gas is supplied into the precombustion chamber 30 is formed in the water jacket 12. A check valve 15 is provided in the main body 11 so as to control a flow path defined by the gas supply passage 14 and prevent combustion gas from flowing backwards.

The water jacket 12 is coupled to a lower end of the main body 11 in such a way that the water jacket 12 encloses the spark plug 20. A coolant circulation passage 12a for circulation of coolant is formed in the water jacket 12 to prevent the spark plug 20 from being overheated.

The precombustion chamber tip 13 is coupled to a lower end of the water jacket 12. The precombustion chamber 30 is formed by the coupling between the precombustion chamber tip 13 and the water jacket 12. Communicating with the main combustion chamber, a plurality of injection holes 13a are formed in a lower end of the precombustion chamber tip 13 so that ignited fuel gas flows into the main combustion chamber through the injection holes 13a.

In the drawings, reference numeral 40 denotes a gasket.

The conventional precombustion chamber structure has the following problems.

First, it is not easy to disassemble the precombustion chamber tip so that maintenance, repair or inspection of the interior of the precombustion chamber is difficult.

Second, because the gas injection passage connected to the precombustion chamber is short, combustible gas easily flows backwards towards the check valve. Such backflow gas causes a valve sticking phenomenon, whereby the check valve is easily damaged.

Third, the sealing structure is not reliable, thereby increasing the risk of gas leakage.

DISCLOSURE

Technical Problem

Accordingly, the present invention has been made keeping in mind the above problems occurring in the prior art, and an object of the present invention is to provide a precombustion chamber structure for a gas engine which is configured to facilitate disassembly of a precombustion chamber tip, thus making maintenance, repair or inspection of the precombustion chamber easy.

Another object of the present invention is to provide a precombustion chamber structure for a gas engine which has an improved sealing structure to reduce the risk of gas leakage.

A further object of the present invention is to provide a precombustion chamber structure for a gas engine which is configured such that a rate at which fuel gas is supplied into the precombustion chamber can be controlled, thus optimizing the performance of the engine.

Yet another object of the present invention is to provide a precombustion chamber structure for a gas engine which can effectively dissipate high-temperature heat from the precombustion chamber to the outside, thus extending the lifetime of the precombustion chamber tip.

Technical Solution

In order to accomplish the above objects, the present invention provides a precombustion chamber structure for a gas engine, including: a body comprising a main body, a water jacket and a precombustion chamber tip; and a spark plug for igniting fuel gas injected into the precombustion chamber formed in the body, the precombustion chamber structure igniting the fuel gas and supplying the ignited fuel gas into a main combustion chamber, wherein a tool insert groove is formed in the precombustion chamber tip, the tool insert groove forming a space in a junction between the precombustion chamber tip and the water jacket so that a tool for disassembly is allowed to be inserted into the space.

Furthermore, a groove may be formed in an upper surface of the precombustion chamber tip in such a way that the groove surrounds the precombustion chamber, thus enhancing airtightness between the water jacket and the precombustion chamber tip.

In addition, a gas supply passage may be formed in the water jacket, the gas supply passage extending to an upper end of the water jacket The precombustion chamber structure may further include: a first O-ring provided in a junction between the main body and the water jacket, the first O-ring maintaining airtightness of a space in which the spark plug is installed; and a second O-ring provided in the junction between the main body and the water jacket, the second O-ring maintaining airtightness of a space in which the check valve is installed.

Further, an orifice may be provided in the gas supply passage formed in the water jacket, the orifice controlling an injection rate of fuel gas.

The precombustion chamber structure may further include a precombustion chamber bushing enclosing the precombustion chamber tip, the precombustion chamber bushing being made of any one of copper, a copper alloy and aluminum and dissipating high-temperature heat from the precombustion chamber to the outside.

The precombustion chamber bushing may be coupled to the precombustion chamber tip in a force-fitting manner so that high-temperature and high-pressure combustion gas that has been in the main combustion chamber can be prevented from entering space between the precombustion chamber tip and the precombustion chamber bushing.

Advantageous Effects

According to the present invention, a space is defined in the junction between a precombustion chamber tip and a water jacket by a tool insert groove formed in the precombustion chamber tip. A tool for disassembly can be inserted into the space so that, when maintenance, repair or inspection work of the precombustion chamber structure is required, the precombustion chamber tip can be easily disassembled from the water jacket. Thereby, it becomes possible to clean even inside of the precombustion chamber and remove carbon. Further, a no longer functioning precombustion chamber tip can be easily replaced with a new one.

Furthermore, a groove is formed on an upper surface of the precombustion chamber tip that comes into close contact with the water jacket. Thereby, even if the upper surface of the precombustion chamber tip is slightly inclined or has an asymmetric structure, the sealing structure can be reliably ensured, thus preventing leakage of combustion gas.

In addition, the gas supply passage along which combustion gas flows extends, longer than that of the conventional precombustion chamber structure, from an upper end of the water jacket to the precombustion chamber. As a result, backflow of combustible gas can be reduced.

O-rings are individually and respectively provided in a space in which a spark plug is installed and a space in which a check valve is installed. Thereby, leakage of combustion gas can be more reliably prevented.

An orifice provided in the gas injection passage is used to control a rate at which fuel gas is injected into the precombustion chamber, thus enhancing the combustion performance of the precombustion chamber, thereby improving the performance of the engine.

Further, high-temperature heat generated from the precombustion chamber can be effectively dissipated to the outside. As a result, the lifetime of the precombustion chamber tip can be extended.

Figure 1:
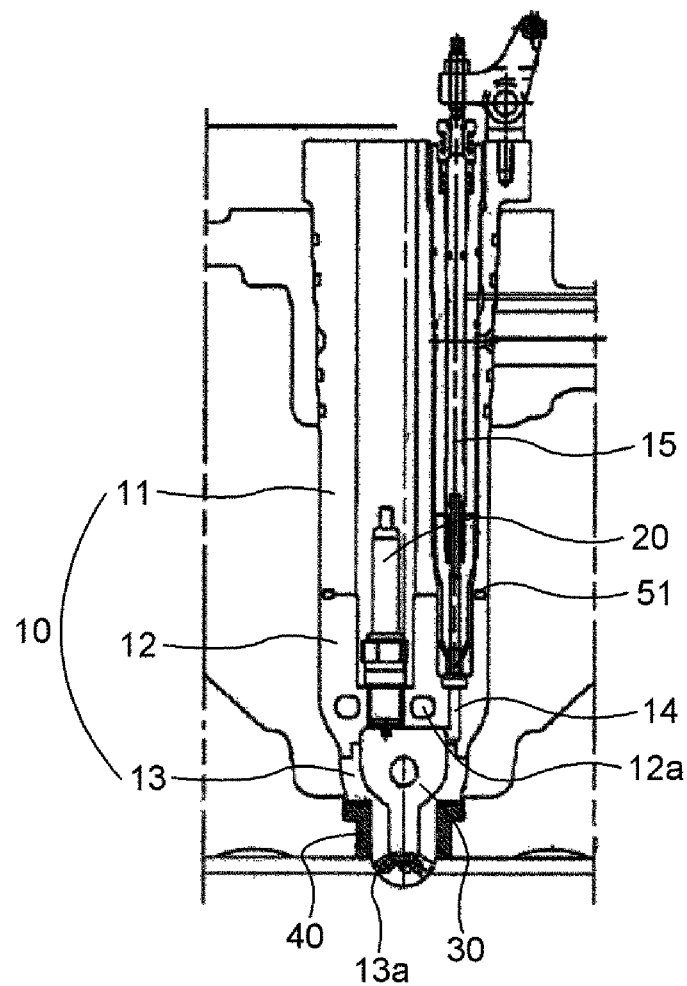
FIG. 1 is a sectional view of a conventional precombustion chamber structure for a gas engine.

DESCRIPTION OF THE REFERENCE NUMERALS IN THE DRAWINGS (110): body (111): main body
(112): water jacket (1121): gas supply passage
(1122): orifice (113): precombustion chamber tip
(1131): tool insert groove (1132): groove
(114): precombustion chamber
(115): precombustion chamber bushing
(120): spark plug (131): first O-ring
(132): second O-ring

BEST MODE

Hereinafter, a preferred embodiment of the present invention will be described with reference to the attached drawings. If in the specification, detailed descriptions of well-known functions or configurations would unnecessarily obfuscate the gist of the present invention, the detailed descriptions will be omitted.

Figure 2:
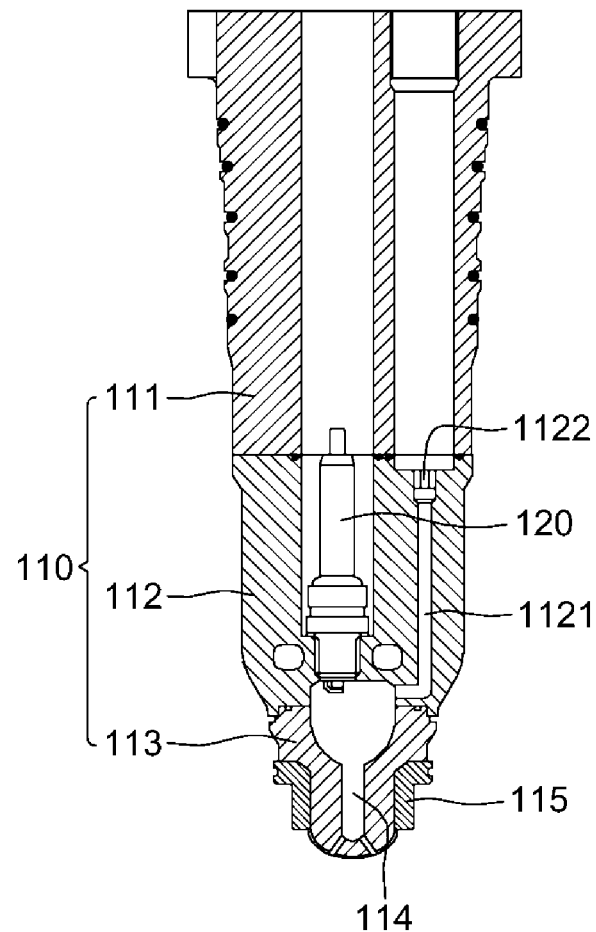
FIG. 2 is a sectional view of a precombustion chamber structure according to a preferred embodiment of the present invention.
Figure 3:
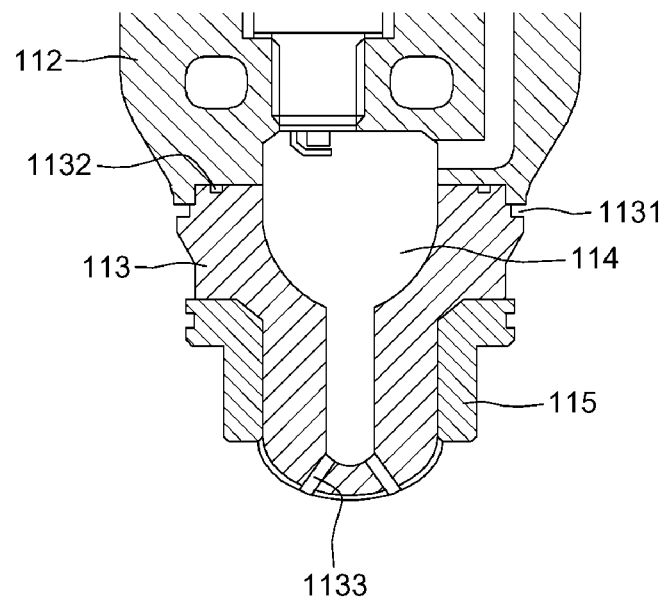
FIG. 3 is a sectional view showing the coupling of a precombustion chamber tip to a water jacket according to the present invention.
Figure 4:
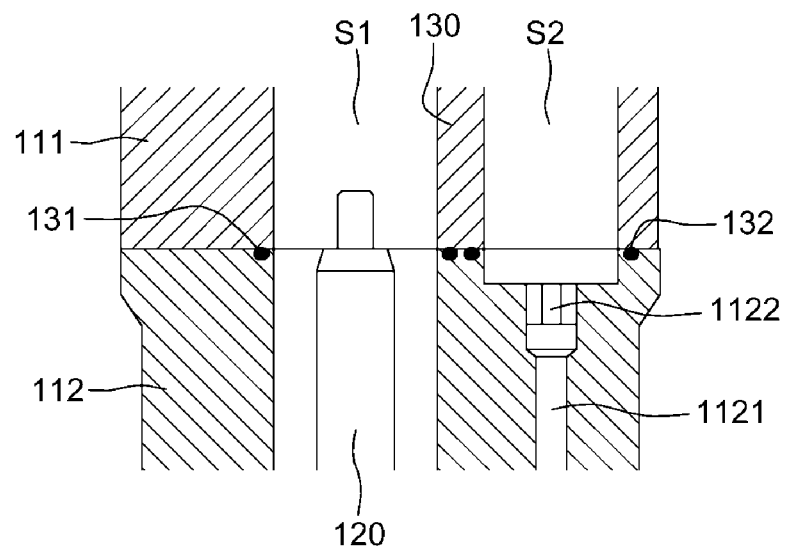
FIG. 4 is a sectional view showing the coupling of the water jacket to a main body according to the present invention.

FIG. 2 is a sectional view of a precombustion chamber structure according to a preferred embodiment of the present invention. FIG. 3 is a sectional view showing the coupling of a precombustion chamber tip to a water jacket according to the present invention. FIG. 4 is a sectional view showing the coupling of the water jacket to a main body according to the present invention.

The precombustion chamber structure for gas engines according to the present invention is the same as the conventional precombustion chamber structure in that it includes a body 110 and a spark plug 120, and the body 110 includes a main body 111, a water jacket 112 and a precombustion chamber tip 113. However, unlike the conventional precombustion chamber structure, the present invention is configured such that disassembly of the precombustion chamber tip 113 is facilitated to enhance work convenience when repair, maintenance or inspection is conducted, leakage of gas can be more reliably prevented by improvement in a sealing structure, and the amount of fuel gas that is injected into the precombustion chamber 114 can be controlled.

In detail, the precombustion chamber structure according to the present invention further has a tool insert groove 1131 which is formed in the precombustion chamber tip 113 to facilitate the disassembly of the precombustion chamber tip 113.

The tool insert groove 1131 is formed in an outer surface of the precombustion chamber tip 113 and extends along a periphery of the precombustion chamber 114. When the precombustion chamber tip 113 is coupled to the water jacket 112, space is formed between the precombustion chamber tip 113 and the water jacket 112 by the tool insert groove 1131. A tool for disassembly can be inserted into the space so as to facilitate disassembly of the precombustion chamber tip 113 from the water jacket 112. Thereby, work convenience can be enhanced.

Furthermore, in the precombustion chamber structure according to the present invention, so as to enhance airtightness between the precombustion chamber tip 113 and the water jacket 112, a groove 1132 is formed in an upper surface of the precombustion chamber tip 113 in such a way that the groove 1132 surrounds the precombustion chamber 114 and extends along the perimeter of the precombustion chamber tip 113.

For instance, when the precombustion chamber tip 113 is coupled to the water jacket 112, the upper surface of the precombustion chamber tip 113 and a lower surface of the water jacket 112 are maintained to be parallel to each other and brought into close contact with each other. Thereby, a sealing structure is provided between the precombustion chamber tip 113 and the water jacket 112. However, if the upper surface of the precombustion chamber tip 113 and the lower surface of the water jacket 112 are finely inclined to each other or have an asymmetric structure because of machining or assembly errors, gas may leak between the precombustion chamber tip 113 and the water jacket 112.

To overcome the above problem, in the present invention, the groove 1132 is formed in the upper surface of the precombustion chamber tip 113. The groove 1132 reduces the problem of the finely-inclined structure or asymmetric structure, thus preventing combustion gas from leaking between the precombustion chamber tip 113 and the water jacket 112

Moreover, in the precombustion chamber structure according to the present invention, so as to more effectively prevent leakage of combustion gas, first and second O-rings 131 and 132 are respectively provided around a space S1 in which the spark plug 120 is installed, and a space S2 in which a check valve is installed.

As shown in FIG. 1, the conventional precombustion chamber structure is configured such that space in which the spark plug 20 is installed and space in which the check valve is installed are airtightly sealed by only a single O-ring 51. Therefore, combustible gas that is in the space in which the check valve is installed may leak into the space in which the spark plug is installed. However, in the present invention, the first O-ring 131 is installed in the junction between the main body 111 and the water jacket 112 so as to maintain the airtightness of the space S1 in which the spark plug 120 is installed. In addition, the second O-ring 132 is installed in the junction between the main body 111 and the water jacket 112 so as to maintain the airtightness of the space S2 in which the check valve is installed.

To secure space for installation of the first O-ring 131 and the second O-ring 132, in the present invention, the diameter of an upper end of the water jacket 112 is expanded, and the thickness of a partition wall 130 which is disposed between the space S1 pertaining to the spark plug 120 and the space S2 pertaining to the check valve is increased.

Furthermore, in the precombustion chamber structure according to the present invention, a gas supply passage 1121 along which combustion gas flows extends from the upper end of the water jacket 112 to the precombustion chamber 114. The gas supply passage 1121 is longer than the conventional gas supply passage so that backflow of combustible gas can be minimized.

Further, an orifice 1122 is formed in the gas supply passage 1121 so as to control the rate at which combustion gas is injected into the precombustion chamber 114. As such, by virtue of the orifice 1122 formed in the gas supply passage 1121, the rate at which combustion gas is injected into the precombustion chamber 114 can be controlled such that the performance of the engine is maximized.

The precombustion chamber structure according to the present invention further includes a precombustion chamber bushing 115 which is provided to efficiently dissipate high-temperature heat generated in the precombustion chamber 114 to the outside and maintain airtightness between the precombustion chamber tip 113 and a main combustion chamber.

The precombustion chamber bushing 115 is configured is such a way that it encloses the precombustion chamber tip 113. The precombustion chamber bushing 115 is made of any one of copper, a copper alloy and aluminum which has high thermal conductivity so as to effectively dissipate heat generated in the precombustion chamber 114. As such, because the precombustion chamber bushing 115 which is made of material that has high thermal conductivity dissipates heat generated in the precombustion chamber 114 to the outside, the lifetime of the precombustion chamber tip 113 can be extended.

The precombustion chamber bushing 115 is coupled to the precombustion chamber tip 113 in a tight-fitting manner with a predetermined tolerance so that a reliable sealing structure between the precombustion chamber tip 113 and the precombustion chamber bushing 115 can be formed. If high-temperature and high-pressure combustion gas that has been in the main combustion chamber permeates between the precombustion chamber tip 113 and the precombustion chamber bushing 115, the heat dissipation performance of the precombustion chamber bushing 115 deteriorates. Given this, it is preferable that, as stated above, the precombustion chamber bushing 115 be coupled to the precombustion chamber tip 113 in a tight-fitting manner such that high-temperature and high-pressure combustion gas can be prevented from permeating between the precombustion chamber tip 113 and the precombustion chamber bushing 115.

In the precombustion chamber structure according to the present invention having the above-mentioned construction, fuel gas that flows through the gas supply passage 1121 is injected into the precombustion chamber 114. The fuel gas injected into the precombustion chamber 114 is ignited by the spark plug 120. A flame generated by the ignition of the fuel gas is supplied into the main combustion chamber through injection holes 1133 formed in the precombustion chamber tip 113, whereby mixture gas in the main combustion chamber is burned.

Meanwhile, the above-mentioned function is the same as that of the conventional precombustion chamber structure.

However, in the precombustion chamber structure according to the present invention, the gas supply passage 1121 extends longer than that of the conventional precombustion chamber structure from an upper end of the water jacket 112 towards the precombustion chamber 114. Thus, backflow of combustible gas from the precombustion chamber 114 towards the check valve through the gas supply passage 1121 can be reduced. Such a reduction in the rate at which combustible gas flows backwards can prevent a valve sticking phenomenon of the check valve and increase the durability of the check valve.

Furthermore, the airtightness between the precombustion chamber tip 113 and the water jacket 112 can be reliably maintained by the groove 1132 formed in the upper surface of the precombustion chamber tip 113. Therefore, combustion gas or combustible gas that is injected into the precombustion chamber 114 can be prevented from leaking through the junction surface between the precombustion chamber tip 113 and the water jacket 112.

Further, the first O-ring 131 for maintaining airtightness of the space S1 in which the spark plug 120 is installed and the second O-ring 132 for maintaining airtightness of the space S2 in which the check valve is installed are individually installed to maintain the airtightness of the corresponding spaces. Therefore, combustible gas can be more reliably prevented from entering the space, in which the spark plug 120 is installed, through the junction between the main body 111 and the water jacket 112.

In addition, the orifice 1122 controls the rate at which fuel gas is injected into the precombustion chamber 114 through the gas supply passage 1121, thus enhancing the combustion performance of the precombustion chamber 114. Thereby, the performance of the engine can be maximized.

Particularly, in the precombustion chamber structure according to the present invention, space is defined between the precombustion chamber tip 113 and the water jacket 112 by the tool insert groove 1131 formed in the precombustion chamber tip 113. A tool for disassembly can be inserted into the space so that, when maintenance, repair or inspection work of the precombustion chamber structure is required, the precombustion chamber tip 113 can be easily disassembled from the water jacket 112. The disassembly of the precombustion chamber tip 113 makes it possible to easily clean even the inside of the precombustion chamber 114 to remove carbon. As a result, the performance of the precombustion chamber 114 can be prevented from deteriorating, and the lifetime of the precombustion chamber structure can be further extended.

To extend the lifetime of the precombustion chamber tip 113, it is preferable that the thickness of the portion in which the injection holes 1133 are formed be reduced so that heat transfer efficiency can be further increased.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A precombustion chamber structure for a gas engine, comprising:
    a main body having
        a first hollow space formed in a central portion of the main body in a longitudinal direction, and
        a second hollow space formed in a side portion of the main body in parallel with the first hollow space;
    a water jacket mounted to a bottom of the main body and having
        a third hollow space formed in a central portion of the water jacket in a longitudinal direction and connected with the first hollow space, and
        a gas supply passage formed in a side portion of the water jacket and extending from a top portion to a bottom portion of the water jacket, the gas supply passage being connected with the third hollow space;
    a precombustion chamber tip mounted to a bottom of the water jacket and having a precombustion chamber formed in a center portion thereof;
    a tool insert groove formed on an outer surface of the precombustion chamber tip in a junction area between the precombustion chamber tip and the water jacket along a periphery of the precombustion chamber tip such that when the precombustion chamber tip is mounted to the water jacket, the tool insert groove forms a recessed space by the outer surface of the precombustion chamber tip and an outer portion of the bottom of the water jacket, wherein a tool is inserted into the recessed space to disassemble the precombustion chamber tip from the water jacket;
    a spark plug installed in the first and third hollow spaces and igniting fuel gas injected into the precombustion chamber, the fuel gas ignited by the spark plug being supplied into a main combustion chamber;
    a first O-ring provided between a bottom surface of the main body and a top surface of the water jacket and surrounding the first and third spaces for maintaining airtightness of the first and third spaces in which the spark plug is installed; and
    a second O-ring provided between the bottom surface of the main body and the top surface of the water jacket and surrounding the second space for maintaining airtightness of the second space in which a check valve is installed.

2. The precombustion chamber structure of claim 1, wherein the precombustion chamber tip includes an airtight groove formed on a top surface of the precombustion chamber tip such that when the precombustion chamber tip is mounted to the water jacket, the airtight groove forms a hollowed space surrounding the precombustion chamber between the top surface of the precombustion chamber tip and a bottom surface of the water jacket, thereby enhancing airtightness between the water jacket and the precombustion chamber tip.

3. The precombustion chamber structure of claim 1, wherein an orifice is provided in a top end of the gas supply passage formed in the water jacket for controlling an injection rate of the fuel gas.

4. The precombustion chamber structure of claim 1, further comprising
    a precombustion chamber bushing provided on the outer surface of the precombustion chamber tip, the precombustion chamber bushing being made of any one of copper, a copper alloy and aluminum and dissipating high-temperature heat from the precombustion chamber to an outside.

5. The precombustion chamber structure of claim 4, wherein the precombustion chamber bushing is coupled to the precombustion chamber tip in a force-fitting manner.

* * * * *